US011181984B2

(12) United States Patent
Mok (10) Patent No.: US 11,181,984 B2
(45) Date of Patent: Nov. 23, 2021

(54) VIRTUAL REALITY INPUT AND HAPTIC FEEDBACK SYSTEM

(71) Applicant: Wai Pong Mok, Hong Kong (CN)

(72) Inventor: Wai Pong Mok, Hong Kong (CN)

( * ) Notice: Subject to any disclaimer, the term of this patent is extended or adjusted under 35 U.S.C. 154(b) by 0 days.

(21) Appl. No.: 16/975,144

(22) PCT Filed: Feb. 23, 2019

(86) PCT No.: PCT/IB2019/051476
§ 371 (c)(1),
(2) Date: Aug. 24, 2020

(87) PCT Pub. No.: WO2019/162906
PCT Pub. Date: Aug. 29, 2019

(65) Prior Publication Data
US 2021/0096649 A1    Apr. 1, 2021

Related U.S. Application Data

(60) Provisional application No. 62/634,198, filed on Feb. 23, 2018.

(51) Int. Cl.
*G06F 3/01*    (2006.01)
(52) U.S. Cl.
CPC .............. *G06F 3/016* (2013.01); *G06F 3/014* (2013.01)
(58) Field of Classification Search
CPC ........... G05B 2219/40553; G06F 3/016; G06F 3/04886; B60W 50/16; F15B 13/14; H01H 13/85
See application file for complete search history.

(56) References Cited

U.S. PATENT DOCUMENTS

| | | | | |
|---|---|---|---|---|
| 8,922,355 | B2* | 12/2014 | Kusuura | G06F 3/00 340/407.1 |
| 10,013,062 | B1* | 7/2018 | Corson | G06F 3/016 |
| 10,147,460 | B2* | 12/2018 | Ullrich | G06F 3/016 |
| 10,240,622 | B1* | 3/2019 | Lindsay | F15C 3/04 |
| 10,474,236 | B1* | 11/2019 | Stewart | G06F 3/017 |
| 10,642,356 | B1* | 5/2020 | Wang | G06F 3/03547 |
| 2007/0054270 | A1* | 3/2007 | Inganas | B01L 3/50273 435/6.12 |

(Continued)

*Primary Examiner* — William Lu
(74) *Attorney, Agent, or Firm* — JMB Davis Ben-David (57) ABSTRACT

A virtual reality input and haptic feedback system for sensing hand movements of a user, the system comprises a processing device, a wearable object to be worn on the hand of the user, a sensor system, a sensor, an electronic control device, and a feedback system. The feedback system comprises at least one fluidic actuation device, at least one expandable member, at least one movable valve, and a haptic feedback device. The haptic feedback device has a variable surface configured to simulate the softness or texture of a virtual surface. The processing device calculates the strength and amplitude of provided feedback to each part of the user's hand from the input data, and controls the fluid actuation device and the movable valve, such that the expandable member expands under increased pressure to maintain an airtight seal, or contracts under reduced pressure, and causes a change in the surface of the haptic feedback device, thereby providing the simulated pressure and the haptic senses of surface texture for the user's hand.

16 Claims, 8 Drawing Sheets

(56) References Cited

U.S. PATENT DOCUMENTS

| | | |
|---|---|---|
| 2012/0172682 A1 | 7/2012 | Linderman et al. |
| 2012/0313020 A1* | 12/2012 | Battlogg ............ F16K 31/0675 251/65 |
| 2013/0019374 A1* | 1/2013 | Schwartz ................ A61F 13/10 2/69 |
| 2014/0313022 A1 | 10/2014 | Moeller et al. |
| 2015/0317910 A1* | 11/2015 | Daniels .................. G09B 21/00 84/485 R |
| 2016/0246370 A1* | 8/2016 | Osman .................. G06T 19/006 |
| 2016/0274662 A1* | 9/2016 | Rimon .................... G06F 3/016 |
| 2016/0363997 A1* | 12/2016 | Black ...................... G06F 3/016 |
| 2017/0131770 A1* | 5/2017 | Keller ..................... G06F 3/011 |
| 2017/0319950 A1 | 11/2017 | Buchanan et al. |
| 2018/0209562 A1* | 7/2018 | Keller ..................... G06F 3/016 |
| 2019/0063619 A1* | 2/2019 | Keller .................... F16K 31/02 |
| 2021/0003534 A1* | 1/2021 | Lal ........................ G06F 3/0416 |

\* cited by examiner

VIRTUAL REALITY INPUT AND HAPTIC FEEDBACK SYSTEM

CROSS-REFERENCE TO RELATED APPLICATIONS

This is the US National Stage of International Patent Application PCT/IB2019/051476, filed on Feb. 23, 2019, which in turn claims benefit to U.S. Provisional Patent Application No. 62/634,198 filed Feb. 23, 2018; which is incorporated by reference herein in its entirety.

FIELD OF THE INVENTION

The present invention relates to the field of virtual and augmented reality interfaces. Specifically, the present invention relates to a virtual reality input and haptic feedback system.

BACKGROUND OF THE INVENTION

Users can experience the virtual world through visual and auditory senses through virtual reality (VR)/augmented reality (AR) headsets, but how do users interact with the virtual world through haptics? The disadvantages of general VR handheld controllers include the lack of stress feedback, the inability to provide accurate haptic feedback (no shape, hardness, weight and temperature), and no auto-correlation functions.

With the development of virtual reality (VR)/augmented reality (AR)/mixed reality (MR) head-mounted devices, users can experience the virtual world through visual and auditory senses, but how users interact with the virtual world through haptics depends on the collected mobile data and the provided feedback from the virtual reality interface. The general virtual reality interface or system can only provide a simple stress feedback function, but cannot accurately simulate the reaction force or stress generated by the object. In addition, these systems are also unable to provide feedback on the surface texture or the sense of reality, allowing users to feel the physical characteristics of the virtual world.

SUMMARY OF THE INVENTION

According to the virtual reality input and haptic feedback system of the present invention, the system integrates artificial intelligence machine learning, fast calculation and real strength feedback to replace the traditional controller in VR/AR/MR environment. A smart virtual glove (smart glove) is developed by capturing the action of the user's hand. The interface for inputting geometry transformation and connecting the virtual world is set on a robot arm, and the user can physically touch the virtual object with accurate touch (shape, hardness, weight and temperature) senses. The smart glove realizes immersive interaction with the virtual world and explores new possibilities and applications. In addition, the smart glove can directly execute and use graphical processing unit (GPU) resources on any GPU and can quickly calculate and real-time process three-dimensional motion pointing to the VRL world.

The virtual reality input and haptic feedback system according to the present invention can provide at least the following advantages:

Realizing real feeling and augmenting reality environment in VR/AR/MR world with accurate haptic (shape, hardness, weight and temperature) senses.

When the user holds the "virtual object", the user feels the force feedback, the force maintaining torque, the reaction force, the shape and texture on the object.

By using the air flow energy drive system and special chemical reaction to perform the force feedback, the force maintaining torque, the reaction force, the shape and texture on the object.

By using the finger and arm motion tracking system to measure the user's arm, wrist and reverse movements in the virtual world.

Each glove is embedded with the gyroscope, accelerometer and magnetometer to measure the direction of the user's hand and movement and output the measured direction to the robot arm system to drive and control the robot arm.

By using the completely wireless technology to provide a truly immersive experience without being hindered by wires.

The smart virtual glove (smart glove) system is embedded with the GPU, IOS and

Android applications.

The present invention aims to provide a virtual reality input and haptic feedback system, which is a virtual reality data input system for sensing the movement of a user's hand, and can provide feedback feeling to the user's hand, including:

a processing device having a data interface;

a wearable object for being worn on the user's hand, the wearable object includes a finger portion and a palm portion;

a sensor system, including:

at least one accelerometer is set on each finger portion;

at least one flexible sensor is set on each finger; and at least one other sensor is set in anyone of the finger portion or the palm portion;

an electronic control device electrically connected to at least one of the accelerometer and at least one of the flexible sensor, and is configured to receive electrical signals from at least one accelerometer and at least one flexible sensor, convert the electrical signal into input data and transmit to the processing device through the data interface;

a feedback system, including:

at least one fluid actuation device;

at least one expandable member, the plurality of expandable members are provided on the finger portion and the palm portion;

at least one movable valve connected to the at least one fluid actuation device; and a haptic feedback device with a variable surface configured to simulate the softness or texture of a virtual surface, wherein the at least one expandable member is fluidly connected to the fluid actuation device for pressurizing the expandable member, the at least one movable valve keeps the expandable member airtight or depressurized, the feedback system is configured to apply or reduce pressure to at least one part of the user's hand;

the fluid actuation device, the movable valve and the haptic feedback device are respectively connected to the electronic control device, the processing device calculates the strength and amplitude of provided feedback to each part of the user's hand from the input data, and transmits the output data to the electronic control device, the electronic control device sends a control signal to the feedback system to control the fluid actuation device and the movable valve, such that the expandable member expands under increased pressure, maintain airtightness or reduce pressure, and causes a change in the surface of the haptic feedback device, thereby providing the simulated pressure and the haptic senses of surface texture for the user's hand.

In one embodiment, the haptic feedback device includes a plurality of independently controllable haptic feedback components.

In one embodiment, the haptic feedback components are arranged in a matrix structure, each of the haptic feedback components reduces the softness or becomes hardened when current passes, the haptic feedback components are controlled by the electronic control device.

In one embodiment, the haptic feedback components include a compound containing starch solvent and silicone gel.

In one embodiment, the haptic feedback components are driven by the electronic control device in a pulse width modulation manner to produce different degrees of softness or hardness.

In one embodiment, the haptic feedback device uses the independently controlled haptic feedback components to simulate the physical form of surfaces of the substance, when the haptic feedback device is attached to the user's finger, the haptic feedback device allows the user to perceive the surface characteristics of surfaces of the simulated substance.

In one embodiment, the surface characteristics include: smoothness, roughness, softness and hardness.

In one embodiment, the expandable member includes a first layer film and a second layer film, wherein the first layer film and the second layer film are composed of different organic polymer plastics and resin film materials.

In one embodiment, the first layer is an expandable soft film composed of resin film materials.

In one embodiment, the second layer is a non-expandable hard film composed of organic polymer plastic materials.

In one embodiment, the expandable member controls the expansion of the soft film of the first layer through the processor, the expanded part generates the supporting force and the squeezing force, so that the palm portion of the user feels powerful feedback.

In one embodiment, the haptic feedback device is an electro-variable film simulating the shape and texture, the electro-variable film is a gel state fluid composed of polymer, amylose particles and amylopectin particles.

In one embodiment, according to the time length and the voltage intensity passed by the current, the gel state fluid hardens and clumps together to form a hard mass.

In one embodiment, the electro-variable film includes two layers of resin films, and each of the resin films is embedded with an electrode contact plate and a region separating domain member.

In one embodiment, the resin films include various organic polyesters, such as polyethylene terephthalate (PET), polycarbonate (PC), polyimide, polyamide, polyamide-imide (PAI). The region separation domain member is arranged between two layers of the resin films to form a plurality of texture pixel elements arranged in lattice. Each of the texture pixel elements has the gel state fluid and is configured as the electro-variable film capable of simulating the shape and texture. A row and column lattice driver is used to control the voltage switch of each of the texture pixel elements to produce a chemical reaction of the gel state fluid. Thereby, the gel state fluid in at least one of the texture pixel elements is hardened to simulate the shape and texture.

In one embodiment, the fluid actuation device is an electric air pump, and the expandable member is an inflatable bladder.

In one embodiment, the movable valve is a magnetic fluid control valve, and the movable valve closes its valve when energized to prevent the passage of fluid.

In one embodiment, the movable valve is controlled and driven by the electronic control device in a pulse width modulation manner.

In one embodiment, the movable valve can be in opened, partially opened, and closed state, so that the expandable member can be in different pressure states to generate or maintain different feedback forces for the user's hand.

In one embodiment, the haptic feedback device is disposed inside the wearable object and is located between the user's hand and the expandable member when in use.

In one embodiment, the system further includes a sensor monitoring the local fluid pressure of the feedback system.

In one embodiment, the wearable object is a soft glove.

According to another aspect of the present invention, a method for sensing he movement of a user's hand and inputting movement data to virtual reality is provided, including the following steps:

providing a system as described above;

receiving the user's hand into the wearable object;

the sensor system collecting the related signals based on the user's hand movement and transmitting to the electronic control device;

the electronic control device converting the electrical signal into action data and transmitting to the processing device;

the processing device analyzing parameters of the action data and calculating relevant feedback force data, and transmitting to the electronic control device;

the electronic control device controlling the feedback system through the feedback force data and providing a corresponding feedback force to the user's hand through the feedback system to simulate the reaction force of holding the simulated object in the virtual reality; and the processing device transmitting data or parameters of the substance surface in the virtual reality to the electronic control device to let the electronic control device control the haptic feedback device, so that the haptic feedback device provides perception to the user's hand to simulate the physical form of the substance surface in the virtual reality.

BRIEF DESCRIPTION OF THE DRAWINGS

Embodiments of the present invention are described below by way of example with reference to the accompanying drawings in which.

DETAILED DESCRIPTION OF THE INVENTION

The technical solutions in the embodiments of the present invention are clearly and completely described in the following with reference to the accompanying drawings in the embodiments of the present invention. It is obvious that the described embodiments are only parts of the embodiments of the present invention, and not all of the embodiments. Based on the embodiments of the present invention, all other embodiments obtained by a person of ordinary skill in the art without creative work should fall within the protection scope of the present invention.

Some embodiments disclosed herein relate generally to a haptic feedback device which is configured to use haptic senses to represent virtual objects in contact by the people in VR, AR, and MR spaces. The smart glove uses airflow energy drive technology, special chemical reaction control technology and advanced motion capture algorithms to perform real object senses with precise haptic senses (shape, hardness) in the world of Virtual Reality (VR)/Augmented Reality (AR)/Mixed Reality (MR), maintaining torque, force and surface temperature and texture of the object and touch (haptic) feel. Unlike most haptic sensing systems (for example application service motor drive system), the present invention performs haptic feel and haptic senses. When you want to grab objects in the virtual/augmented world, cuffs on the fingertips of the smart glove swell and produce pressure on the fingertips, so the user can feel the virtual objects seamlessly and create "touch" feel; i.e., the smart glove stimulates your hands to convey the emotional use of airflow energy.

Moreover, the smart glove can not only adapt your fingers to the shape of virtual objects, but also dynamically change the airflow to simulate the hardness of virtual objects, so the user can not only perceive the physical existence of virtual objects, but also the shape and weight, such as the difference between a virtual metal sword and a virtual rubber doll. The pouched fingertips can indeed be flexible and inflated to create the haptic senses. In addition, the smart glove performs the surface temperatures to sense the virtual objects, such as the difference of placing the user's hand in cold water and near a burning fireplace.

The smart glove can be combined with its own Software Development Kit (SDK) to make it easy for VR/AR/MR developers to use different features in virtual environments. The developers can use SDK to develop applications through Facebook Oculus, HTC Vive, Sony PlayStat VR, Samsung Gear VR, Microsoft HoloLens, Google Daydream, Google Cardboard and other VR/AR/MR devices.

Figure 1:
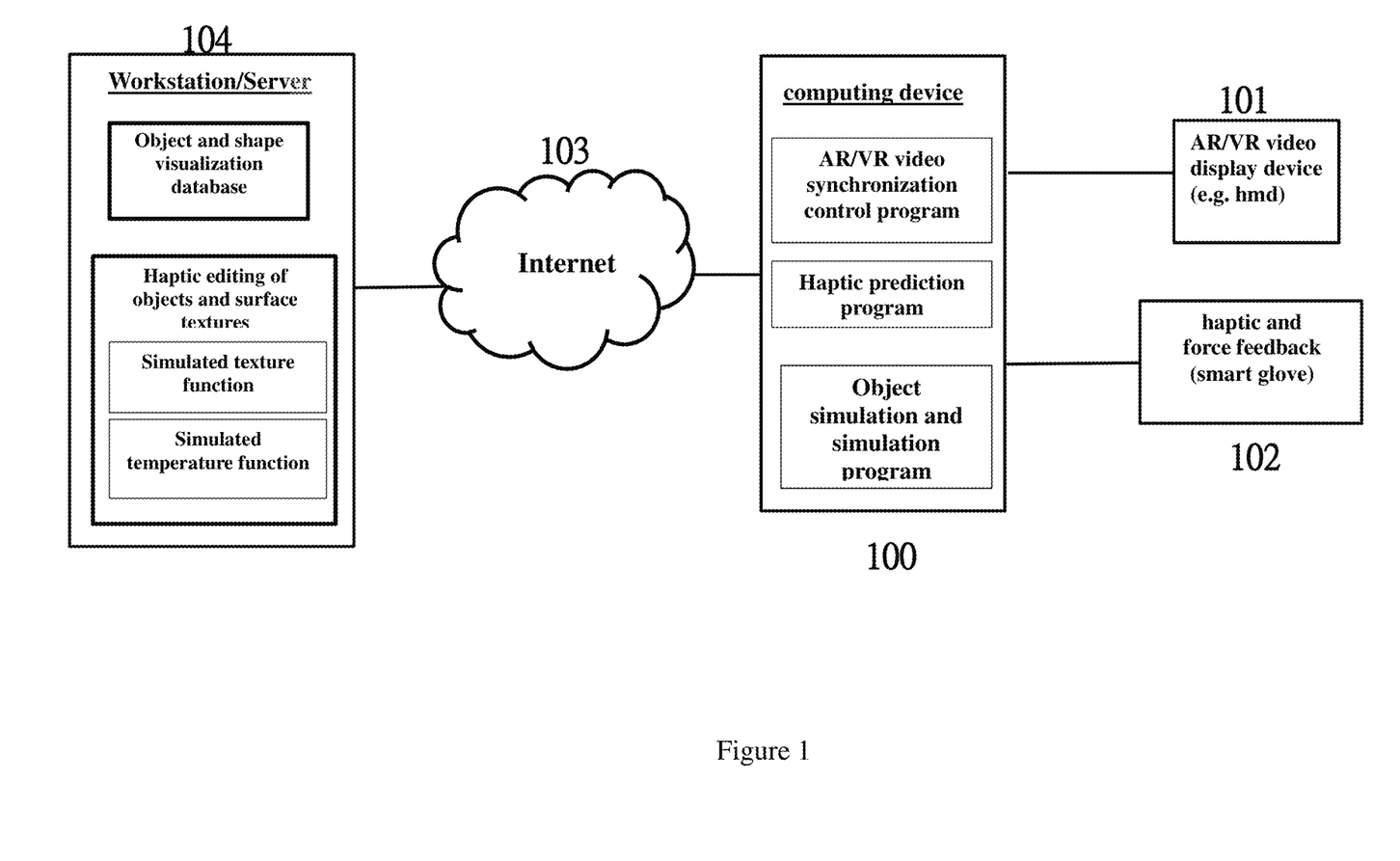
FIG. 1 is an architectural embodiment illustrating the smart glove with haptic and force feedback in accordance with the disclosed embodiments.

A simplified block diagram of the architecture of a smart glove based on haptic and force feedback as shown in FIG. 1. The haptic neural artificial intelligence (AI) system is mainly divided into two parts:

1. a haptic neural AI core processor 209 and 301 of the smart glove;
2. a haptic neural AI program 100 of the application software program on computer of the user end.

The system architecture includes the following devices:
100 is a computer device (including computer, smart phone, and tablet device);
101 is a device for a head mounted display;
102 is a smart glove with haptic and force feedback designed by the present invention;
103 is a way connected to the Internet; and
104 is a workstation and server device of a haptic neural AI program library.

100 is the program for installing a haptic neural AI system to correspond to the connection haptic data of the smart glove, calculating and connecting of the head mounted display 101, and connecting the signal of the smart glove 102. The program can upload and download the library 104 from the Internet to connect and update of program 100.

103 is the smart glove with haptic and force feedback designed by the present invention. The haptic neural AI core processor is embedded in the smart glove with haptic and force feedback to realize haptic data such as touch feeling, texture, shape, temperature and weight of the objects touched by the user in the virtual world.

Figure 2:
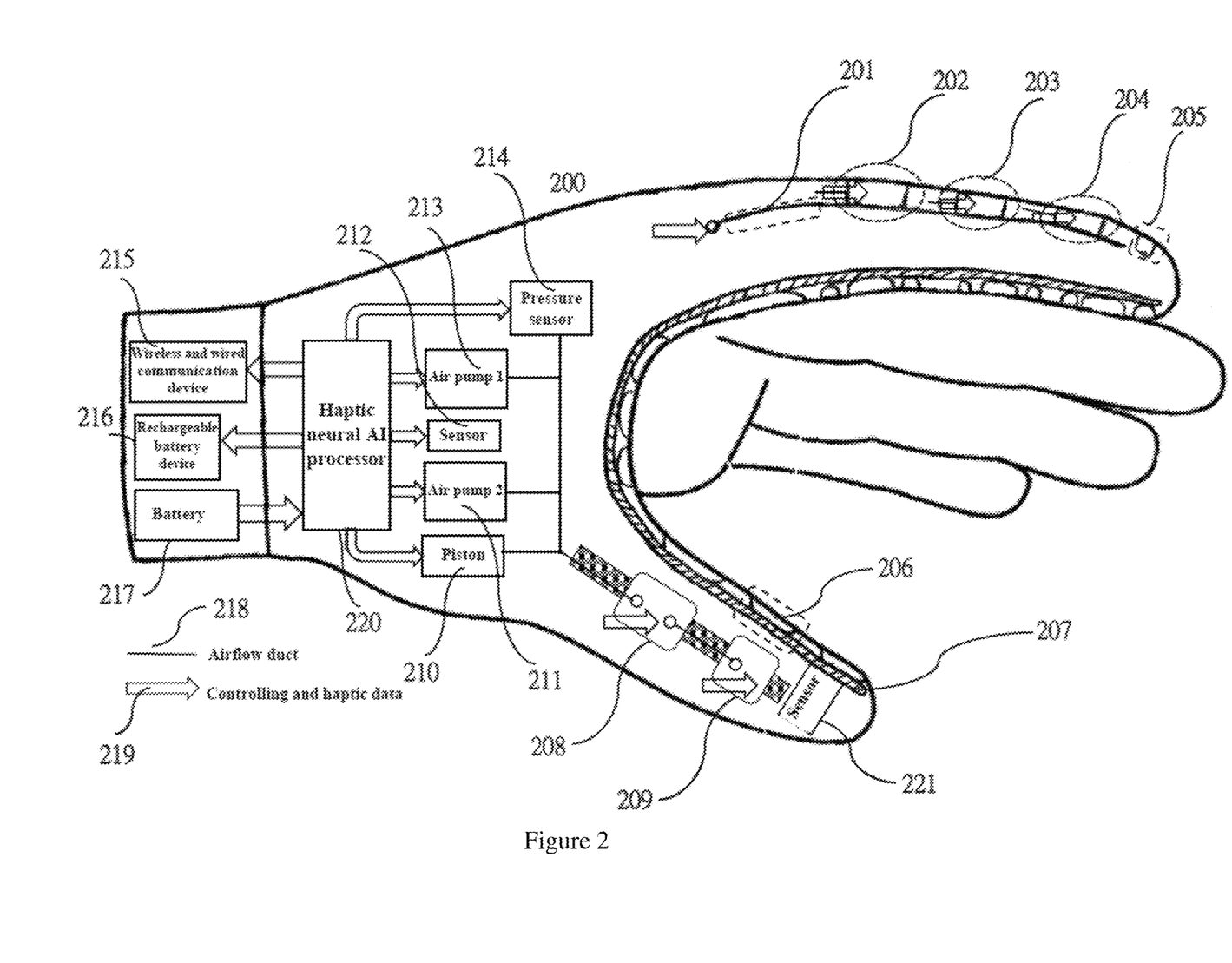
FIG. 2 is a simplified schematic view of a system for illustrating the smart glove for feedback of haptic, texture, shape, temperature and force of virtual and augmented reality objects in accordance with the disclosed embodiments.
Figure 3A:
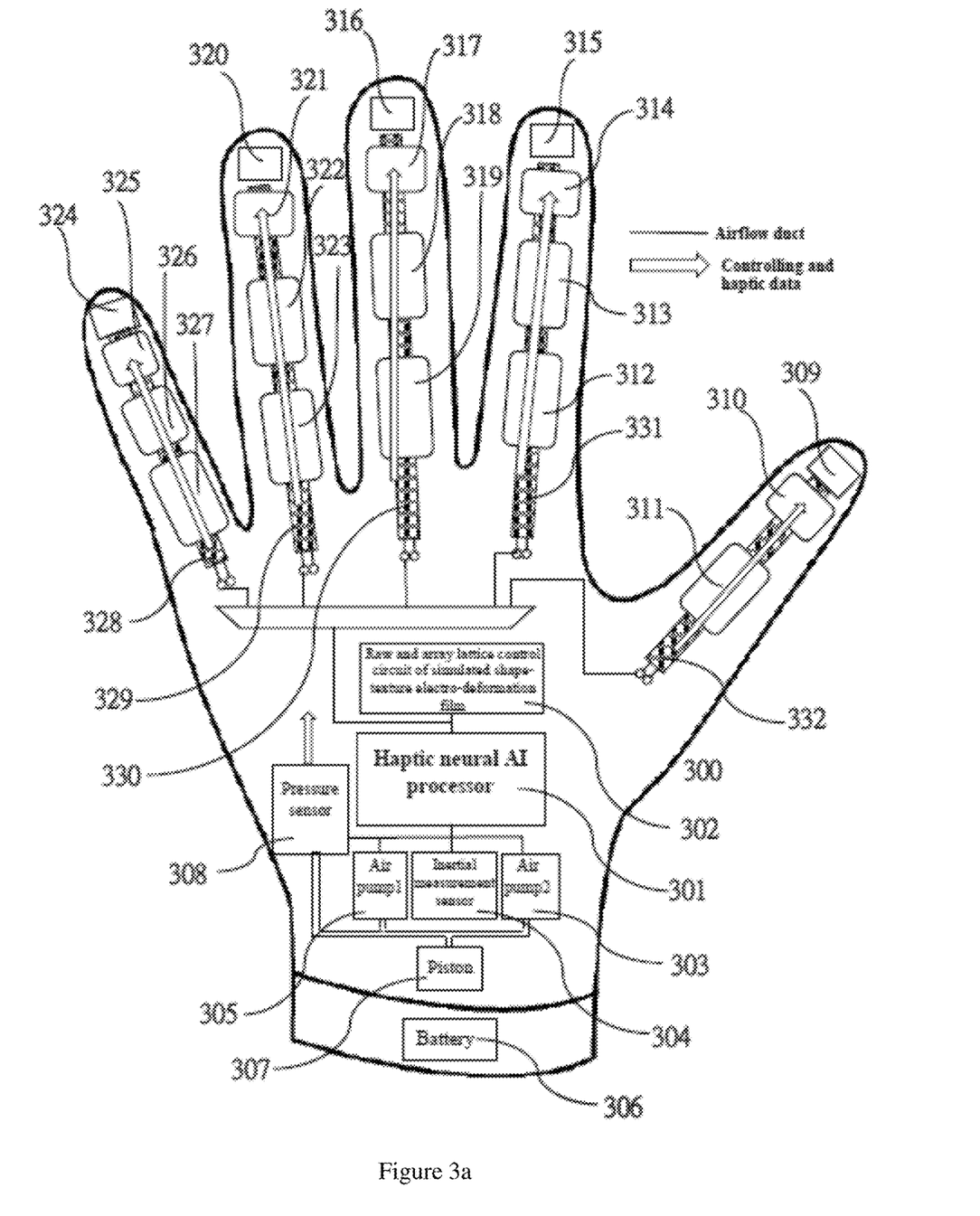
FIG. 3a is a more detailed schematic view of back glove of the left hand's palm portion in accordance with the disclosed embodiments.

According to the simplified schematic diagram of the smart glove with haptic and force feedback as shown in FIGS. 2 and 3a, the haptic neural AI processor is mainly used, controlled, and applied to:

1. Collect the below sensors at the back of the glove:
mobile moving data of at least four sets of acceleration sensors 315, 316, 320, 324 at the fingertips;
mobile moving data of at least two sets of inertial measurement sensors 304 at the center of the back of the palm, and the acceleration sensor 309 at the thumb tip;
moving response data of at least five sets of bending sensing sensors 328, 329, 330, 331, 332 at finger joints;

2. Calculate and optimize the collected mobile moving data to convert into three-dimensional coordinates of the entire hand (C-axis, Y-axis and Z-axis), and predict the moving paths and activities of the hand. The calculated and optimized data is transmitted back to the program in the haptic neural AI system in the computer via the wireless device/wired device to further calculate the haptic data of the haptic and force feedback.

3. Analyze and combine the haptic data transmitted back from the computer to control the following touch, texture, shape, temperature, hardness, force feedback and palm pressure:
controlling the air inflators 303 and 305;
controlling and switching piston devices 210 and 307;
controlling a two-dimensional row circuit device 302 of simulated shape-texture electro-deformation film to control the lattice of simulated shape-texture electro-deformation film to simulate the information of texture etc. on the virtual objects to the palm portion;
controlling the switches 201, 202, 203, 204, 208, 209, 310, 311, 312, 313, 314, 317, 318, 319, 321, 322, 323, 325, 326, 327 of shutters of the micro electromagnetic airflow piston device to inflate or deflate expandable devices of different or related virtual object shapes and the corresponding position of the palm to the virtual objects;

controlling and measuring the pressure of the entire airflow device 214,308.

215 is a wireless and wired communication device of the smart glove. The wireless device uses Bluetooth 5.0 radio technology and the wired device uses USB 3.0 super-speed technology to transmit the haptic data and virtual reality objects of virtual/augmented reality and the data of hand activity of user end to the computer.

216 is a rechargeable battery device of the smart glove.

217 is a rechargeable battery part of the smart glove, wherein the battery is a rechargeable battery using a rechargeable lithium ion battery or a lithium ion polymer battery.

Figure 3B:
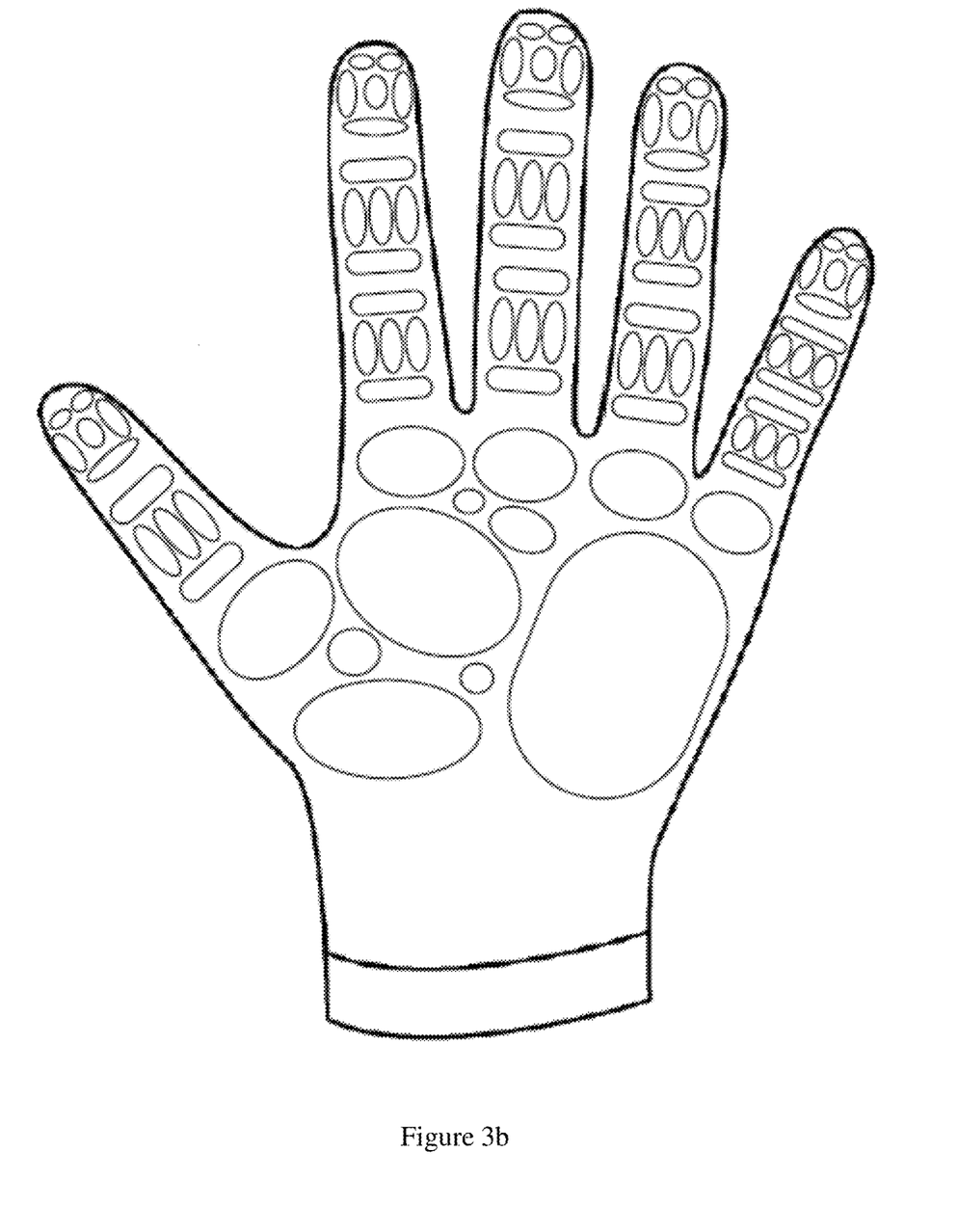
FIG. 3b is a more detailed schematic view of front glove of the left hand's palm portion in accordance with the disclosed embodiments.

The simplified schematic view of a palm inflatable film device of the smart glove with haptic and force feedback shown in FIG. 3*b* is one of designs of the palm inflatable film device of the smart glove, including:

two layers of different organic polymer plastic and resin film materials, for example:

a first layer is an expandable soft film composed of resin film material;

a second layer is a non-expandable hard film composed of organic polymer plastic materials;

through the control of devices such as the haptic neural AI processor, the airflow device and the shutters of the piston device, the expandable soft film is expanded to make the expansion part have supporting force and squeeze feeling, so that the palm of the user feels strong feedback and torque, wherein the more and finer expandable parts are, the greater and more realistic the force feedback and torque will be.

Figure 4A:
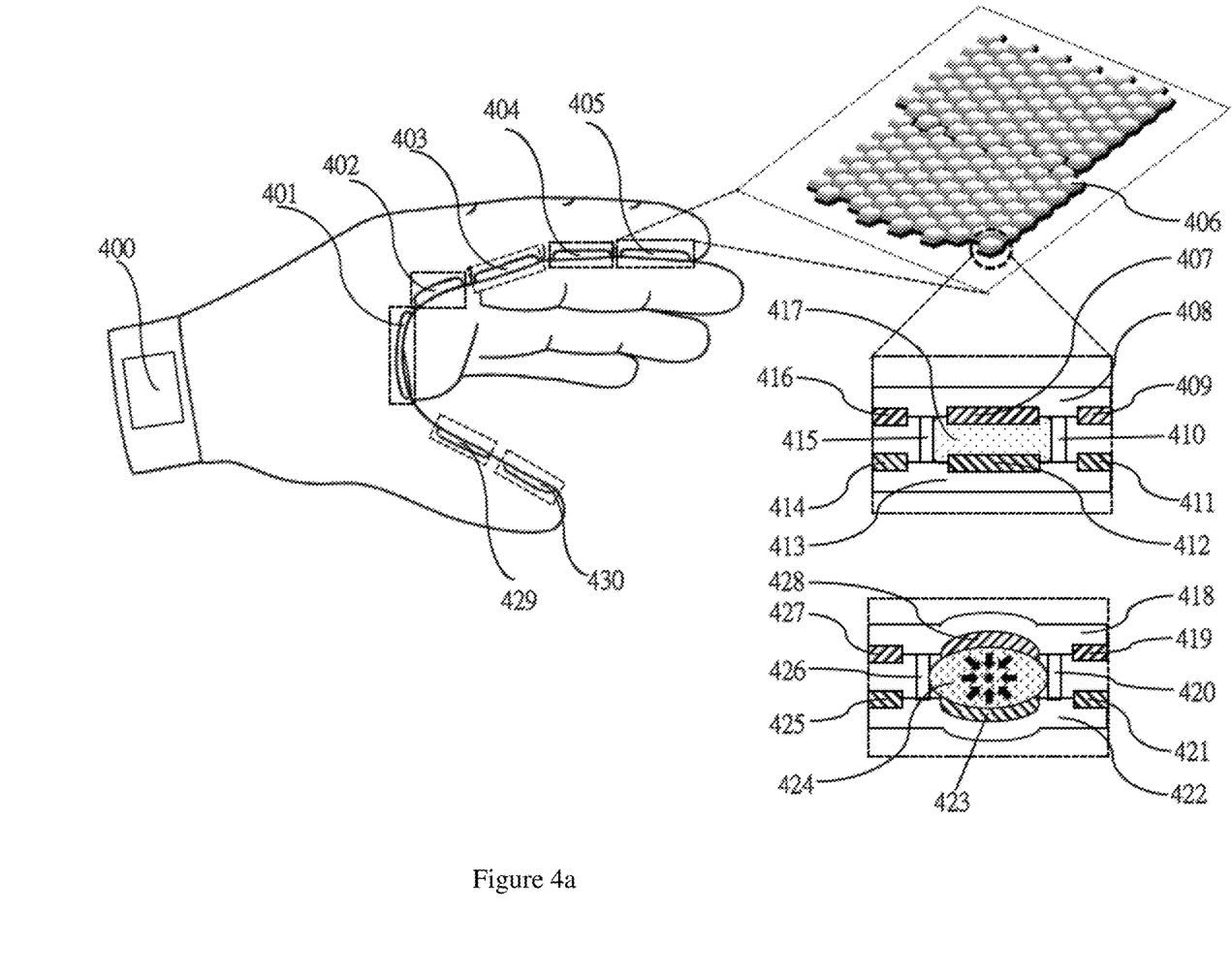
FIG. 4a is a cross-section structural schematic view of the electro-variable film (shape electric plate) simulating shape and texture in the haptic system in accordance with the disclosed embodiments.
Figure 4B:
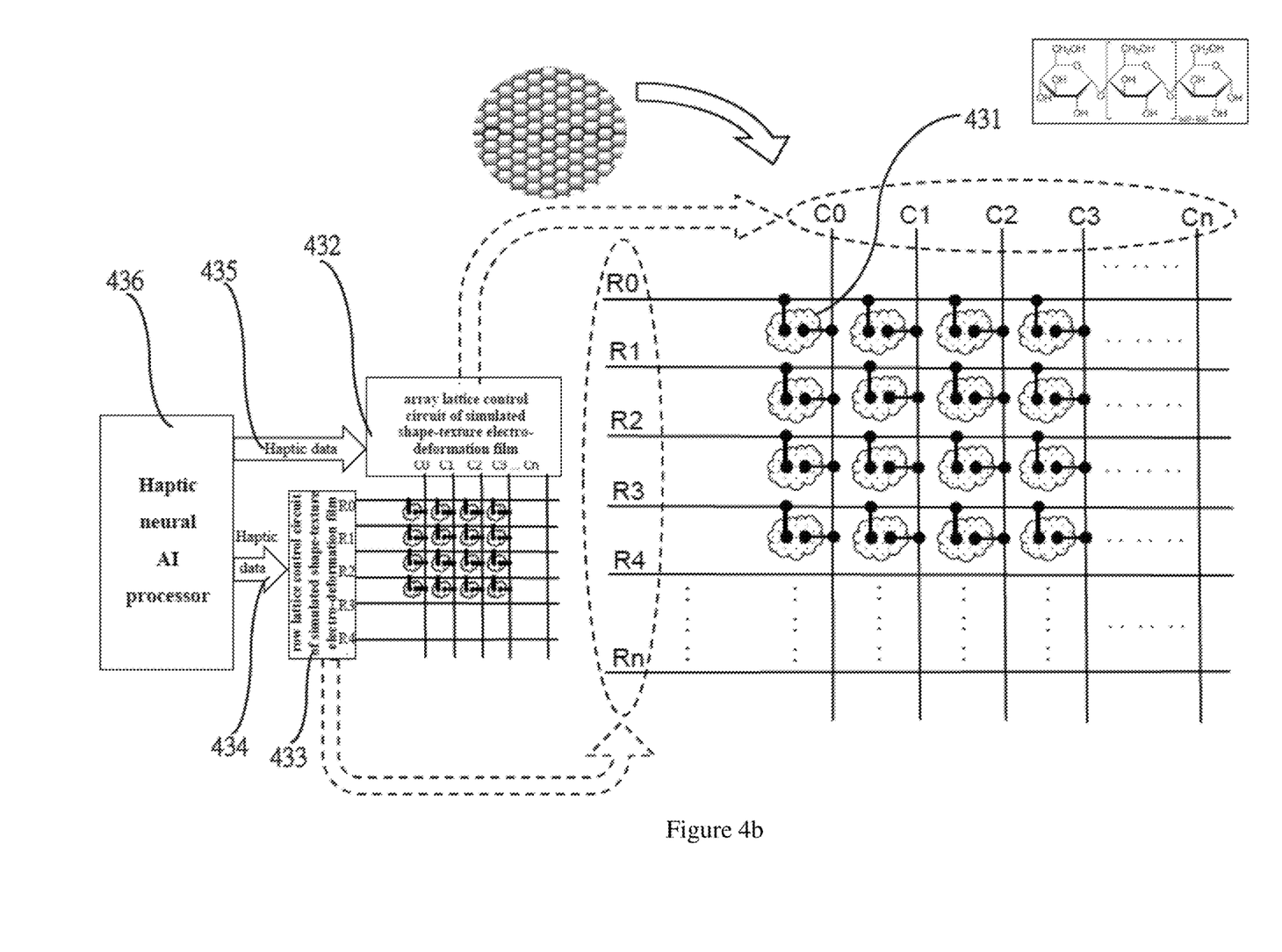
FIG. 4b is a simplified control theoretical diagram of the electro-variable film simulating shape and texture in the haptic system in accordance with the disclosed embodiments.
Figure 5A:
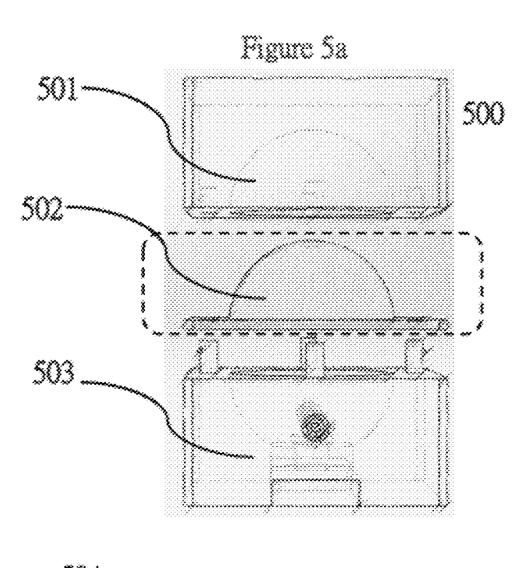
FIG. 5a is a structural schematic view of a micro electromagnetic airflow piston system (micromagnetic fluid controlling cube) in accordance with one embodiment of the disclosed embodiments.
Figure 5B:
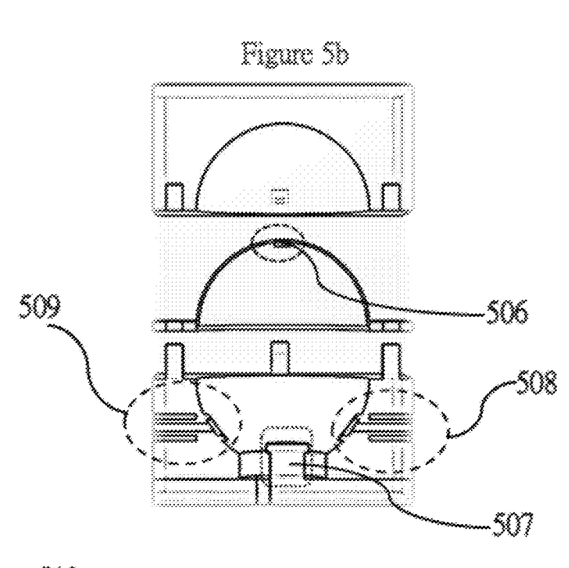
FIG. 5b is a cross-section structural schematic view of the micro electromagnetic airflow piston system in accordance with one embodiment of the disclosed embodiments.
Figure 5C:
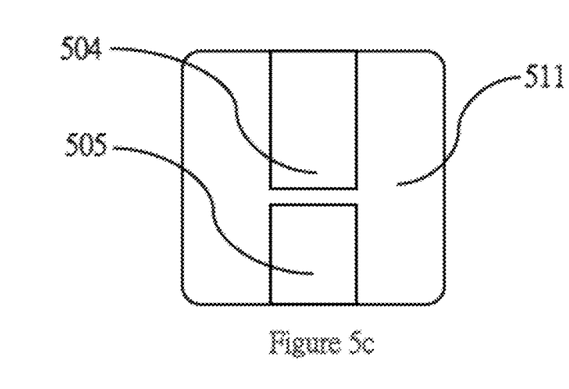
FIG. 5c is a bottom structural schematic view of the micro electromagnetic airflow piston system in accordance with one embodiment of the disclosed embodiments.
Figure 5D:
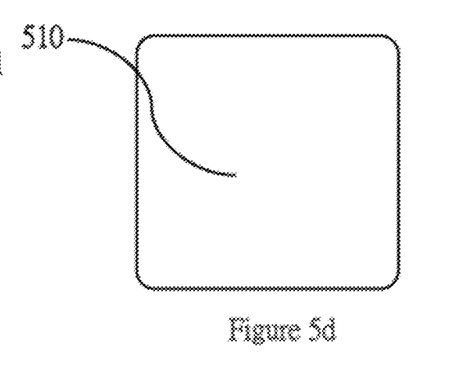
FIG. 5d is a top structural schematic view of the micro electromagnetic airflow piston system in accordance with one embodiment of the disclosed embodiments.

The main design of the simulated shape-texture electro-deformation film according to FIGS. 4*a* and 4*b* is fluids 417 and 431 in a gel state made of polymer, amylose granules and amylopectin granules. Through the current intensity and the application time, the fluids 417 and 431 in the gel state become hardened and agglomerate to form a hardened state.

The control method and application principle of the simulated shape-texture electro-deformation film are as follows:

the design of the simulated shape-texture electro-deformation film includes two layers of resin films:

408(418) is a first layer of resin film;

413(422) is a second layer of resin film, wherein extremely thin electrode contact plates 407(428) and 412(423) are embedded in the above two layers of resin films;

separating rods 415(426), 410(420) at several regions; and the fluids 417(431) in the gel state made of polymers, amylose granules and amylopectin granules (wherein 431 is in hardened state from the gel state fluid produced by solid hardening polymer, amylase granules, and amylopectin granules).

The resin film includes small hexagonal squares imitating shape-texture made of polyethylene terephthalate (PET), polycarbonate (PC), polyimide, polyamide, polyamide-imide (PAI), and various organic polyesters to weave the shape of the haptic system. Through the simulated texture data and through the chemical reaction by the flow of the current, polymers, amylose granules and amylopectin granules in the gel state becomes hardened to produce texture and hardness. The finer the hexagonal square area is, the more detail and more realistic the texture will be.

The control method of simulated shape-texture electro-deformation film, according to FIG. 4*b*:

the simulated shape-texture electro-deformation film mainly uses 2D Systolic Row and Column Array to control the haptic information of texture, hardness of the objects etc. to the palm;

the haptic neural AI processor 436 transmits the shape-texture data 434 and 435, wherein the data 434 is transmitted to row lattice control circuit 433 of the simulated shape-texture electro-deformation film (i.e. the first layer film) and the data 435 is transmitted to column lattice control circuit 432 of the simulated shape-texture electro-deformation film;

the voltage is passed through the upper electrode plate 428(407) in the first layer film to conduct the current and flow to lower electrode plates 424(410) and 423; when the current is passed through the lower electrode plates 424(410) to generate the chemical reaction, the lower electrode plate 424 in gel state is changed into the hardened state instantly to produce texture and hardness.

According to one embodiment of the micro electromagnetic airflow piston shown in FIG. 5, the present invention designs flow directions of different airflows to achieve the corresponding inflatable film device to inflate or deflate. The application principle and device of the micro electromagnetic airflow piston are as follows:

the micro electromagnetic airflow piston includes components 501, 502, 503, 504, 505, 506, and 507. The components 501 and 503 are made of organic polymer plastic, the organic polymer plastic includes a variety of organic polymer plastics such as polypropylene (PP), polystyrene (PS), high impact polystyrene (HIPS), ABS resin (ABS), polyethylene terephthalate (PET), polyester (PES), polyamide (PA), polyvinyl chloride (PVC), polyurethane (PU), polycarbonate (PC), polydichloroethylene (PVDC), polyethylene (PE), melamine-furfural resin (MF), urea furfural resin (UF), phenolic resin (PF), polyetherimide (PEI), polyetheretherketone (PEEK), polytetrafluoroethylene (PTFE), polymethyl methacrylate (PMMA), and polylactic acid (PLA). The component 502 is a film made of rubber, wherein the rubber includes synthetic rubber, natural rubber and styrene-butadiene rubber. The component 506 is a fine magnetic piece. The components 504, 505 and 507 are made of conductive polymer plastic, wherein the conductive polymer plastic includes a variety of organic polymer plastics such as polyacetylene, polystyrene, poly pyrrole, polythiophene, polyaniline and polyphenylene sulfide. The component 507 is an electrically conductive electromagnetic rod.

The control method and application principle of the micro electromagnetic airflow piston are as follows:

the design of the micro electromagnetic airflow piston is a normal open piston device, it is a mechanical piston switch that is completely controlled by a digital logic circuit (logic circuit '1' or '0'), and it is not limited to the design in FIG. 5. For example, the airflow flows from 508 to 509. As long as there is airflow from 508, 500 can directly flow to 509, and the processor can freely flow the airflow to the required duct without any control. If the micro electromagnetic airflow piston is closed, the haptic neural AI processor sends the logic circuit '1', current flows from 504 and generates a magnetic field at 507, automatically pulling 506 and 502 to 507 and sticking it tightly at 507, so that the airway 508 and 509 is tightly closed by 502 and the airway is closed. The electric energy generated by 507 is converted into magnetic force with a stress of about 100 KPa to 500 KPa.

Figure 6:
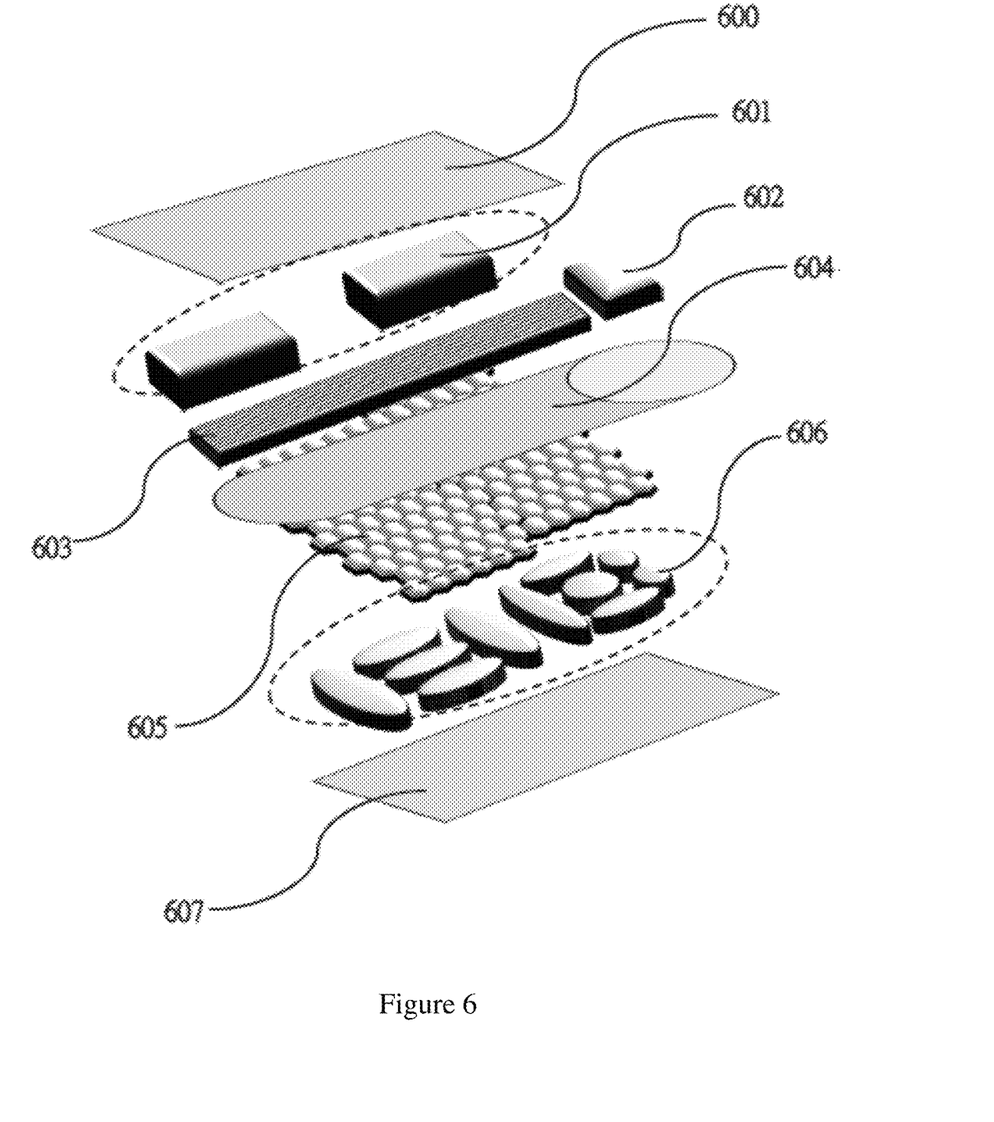
FIG. 6 is a more detailed structural distribution schematic view of the glove in accordance with the disclosed embodiments.

FIG. 6 shows the structure distribution of the entire smart glove. 600 and 607 are the outermost layer of the smart glove (i.e., the outermost surface of the smart glove) and use polyester fiber (Polyester) clothing raw materials to make the glove. 601 is the micro electromagnetic airflow piston.

602 is a sensor with a 3-axis accelerometer or a 9-axis inertial measurement unit. The 3-axis accelerometer is placed on the index finger, middle finger, ring finger and tail finger. The 9-axis inertial measurement unit is placed at the thumb tip and the center of the back of the palm respectively to measure the movement direction, movement speed and other data of the fingers, and then pass the data to the haptic neural AI processor. 603 is a bending sensing sensor to strengthen the rebound force and reaction speed of the joints of the fingers. 604 is the user's finger. 605 is an electro-variable film that simulates the shape and texture, so that the user can touch the surface texture and the hardness of the virtual object in the virtual world and augmented reality.

Although the specification is described in terms of embodiments, every embodiment does not contain only an independent technical solution. The description of the specification is for clarity, and those skilled in the art should treat the specification as a whole and the technical solutions can also be combined appropriately to form other embodiments that can be understood by those skilled in the art. The scope of the present invention is defined by the appended claims rather than the above description, and it is therefore intended to include all changes within the meaning and scope of equivalent requirements of the claims in the present invention.

For those skilled in the art, the present invention is not limited to the details of the above exemplary embodiments, and the present invention can be implemented in other specific forms without departing from the spirit or basic characteristics of the present invention. Therefore, the above-described embodiments should be regarded as exemplary and non-limiting.

What is claimed is:

1. A virtual reality input and haptic feedback system for sensing the movement of a user's hand, comprises:
   a processing device having a data interface;
   a wearable object for being worn on the user's hand, the wearable object comprises a finger portion and a palm portion;
   a sensor system, including:
     at least one accelerometer is set on each finger portion;
     at least one flexible sensor is set on each finger; and
     at least one other sensor is set in anyone of the finger portion or the palm portion;
   an electronic control device electrically connected to at least one of the accelerometer and at least one of the flexible sensor, and is configured to receive electrical signals from at least one accelerometer and at least one flexible sensor, convert the electrical signal into input data and transmit to the processing device through the data interface;
   a feedback system, comprising:
     at least one fluid actuation device;
     at least one expandable member, the plurality of expandable members are provided on the finger portion and the palm portion;
     at least one movable valve connected to the at least one fluid actuation device; and
     a haptic feedback device with a variable surface configured to have softness or texture of a simulated virtual surface;
   wherein the at least one expandable member is fluidly connected to the fluid actuation device for pressurizing the expandable member, the at least one movable valve keeps the expandable member airtight or depressurized, the feedback system is configured to apply or reduce pressure to at least one part of the user's hand;
   wherein the fluid actuation device, the movable valve and the haptic feedback device are respectively connected to the electronic control device, the processing device calculates the strength and amplitude of provided feedback to each part of the user's hand from the input data, and transmits the output data to the electronic control device, the electronic control device sends a control signal to the feedback system to control the fluid actuation device and the movable valve, such that the expandable member expands under increased pressure, maintain airtightness or reduce pressure, and causes a change in the surface of the haptic feedback device, thereby providing the simulated pressure and the haptic senses of surface texture for the user's hand;
   wherein the haptic feedback device is an electro-variable film simulating the shape and texture, and the electro-variable film is a gel state fluid composed of polymer, amylose particles and amylopectin particles;
   wherein according to time length and voltage intensity passed by the current, the gel state fluid of the electro-variable film hardens and clumps together to form a hard mass;
   wherein the electro-variable film comprises two layers of resin films, and wherein each of the resin films is embedded with an electrode contact plate and a region separating domain member;
   wherein the resin films comprise various organic polyesters; the region separation domain member is arranged between two layers of the resin films to form a plurality of texture pixel elements arranged in lattice, and each of the texture pixel elements has the gel state fluid and is configured as the electro-variable film capable of simulating the shape and texture, a row and column lattice driver is used to control the voltage switch of each of the texture pixel elements to produce a chemical reaction of the gel state fluid, thereby the gel state fluid in at least one of the texture pixel elements is hardened to simulate the shape, hardness and texture.

2. The system according to claim 1, wherein the haptic feedback device comprises a plurality of independently controllable haptic feedback components.

3. The system according to claim 2, wherein the haptic feedback components are arranged in a matrix structure, each of the haptic feedback components reduces the softness or becomes hardened when current passes, and the haptic feedback components are controlled by the electronic control device; and wherein the haptic feedback components comprise a compound containing starch solvent and silicone gel.

4. The system according to claim 1, wherein the haptic feedback components are driven by the electronic control device in a pulse width modulation manner to produce different degrees of softness or hardness.

5. The system according to claim 1, wherein the haptic feedback device uses the independently controlled haptic feedback components to simulate the physical form of surfaces of the substance, when the haptic feedback device is attached to the user's finger and palm, the haptic feedback device allows the user to perceive the surface characteristics of surfaces of the simulated substance; and wherein the surface characteristics comprise: smoothness, roughness, softness and hardness.

6. The system according to claim 1, wherein the expandable member comprises a first layer film and a second layer film, and wherein the first layer film and the second layer film are composed of different organic polymer plastics and resin film materials.

7. The system according to claim 6, wherein the first layer film is an expandable soft film composed of resin film materials, and wherein the second layer film is a non-expandable hard film composed of organic polymer plastic materials.

8. The system according to claim 7, wherein the expandable member controls the expansion of the soft film of the first layer film through the processor, and the expanded part generates the supporting force and the squeezing force, so that the palm portion of the user feels powerful feedback.

9. The system according to claim 1, wherein the fluid actuation device is an electric air pump, and wherein the expandable member is an inflatable bladder.

10. The system according to claim 1, wherein the movable valve is a magnetic fluid control valve, and wherein the movable valve closes its valve when energized to prevent the passage of fluid.

11. The system according to claim 1, wherein the movable valve is controlled and driven by the electronic control device in a pulse width modulation manner.

12. The system according to claim 1, wherein the movable valve is in opened, partially opened, and closed state, so that the expandable member is in different pressure states to generate or maintain different feedback forces for the user's hand.

13. The system according to claim 1, wherein the haptic feedback device is disposed inside the wearable object and is located between the user's hand and the expandable member when in use.

14. The system according to claim 1, wherein the system further comprises a sensor monitoring the local fluid pressure of the feedback system.

15. The system according to claim 1, wherein the wearable object is a soft glove.

16. A method for sensing the movement of a user's hand and inputting movement data to virtual reality, comprises the following steps:
providing a system comprising a processing device having a data interface; a wearable object comprising a finger portion and a palm portion; a sensor system comprising at least one accelerometer is set on each finger portion, at least one flexible sensor is set on each finger and at least one other sensor is set in anyone of the finger portion or the palm portion; an electronic control device electrically connected to at least one of the accelerometer and at least one of the flexible sensor; a feedback system comprising at least one fluid actuation device, at least one expandable member, at least one movable valve connected to the at least one fluid actuation device, a haptic feedback device with a variable surface configured to have softness or texture of a simulated virtual surface;
receiving the user's hand into the wearable object;
the sensor system collecting the related signals based on the movement of the user's hand and transmitting to the electronic control device;
the electronic control device converting the electrical signal into action data and transmitting to the processing device;
the processing device analyzing parameters of the action data, calculating relevant feedback force data, and transmitting to the electronic control device;
the electronic control device controlling the feedback system through the feedback force data and providing a corresponding feedback force to the user's hand through the feedback system to simulate the reaction force of holding the simulated object in the virtual reality; and
the processing device transmitting data or parameters of the substance surface in the virtual reality to the electronic control device to let the electronic control device control the haptic feedback device, so that the haptic feedback device provides perception to the user's hand to simulate the physical form of the substance surface in the virtual reality;
wherein the haptic feedback device is an electro-variable film simulating the shape and texture, and the electro-variable film is a gel state fluid composed of polymer, amylose particles and amylopectin particles;
wherein according to time length and voltage intensity passed by the current, the gel state fluid of the electro-variable film hardens and clumps together to form a hard mass;
wherein the electro-variable film comprises two layers of resin films, and wherein each of the resin films is embedded with an electrode contact plate and a region separating domain member;
wherein the resin films comprise various organic polyesters; the region separation domain member is arranged between two layers of the resin films to form a plurality of texture pixel elements arranged in lattice, and each of the texture pixel elements has the gel state fluid and is configured as the electro-variable film capable of simulating the shape and texture, a row and column lattice driver is used to control the voltage switch of each of the texture pixel elements to produce a chemical reaction of the gel state fluid, thereby the gel state fluid in at least one of the texture pixel elements is hardened to simulate the shape, hardness and texture.

* * * * *